United States Patent
Maybee et al.

(10) Patent No.: US 9,779,027 B2
(45) Date of Patent: Oct. 3, 2017

(54) APPARATUS, SYSTEM AND METHOD FOR MANAGING A LEVEL-TWO CACHE OF A STORAGE APPLIANCE

(71) Applicant: Oracle International Corporation, Redwood City, CA (US)

(72) Inventors: Mark Maybee, Boulder, CO (US); Mark J. Musante, Westford, MA (US); Victor Latushkin, Superior, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 117 days.

(21) Appl. No.: 13/655,255

(22) Filed: Oct. 18, 2012

(65) Prior Publication Data
US 2014/0115261 A1 Apr. 24, 2014

(51) Int. Cl.
*G06F 12/00* (2006.01)
*G06F 12/0897* (2016.01)
*G06F 12/123* (2016.01)

(52) U.S. Cl.
CPC ........ *G06F 12/0897* (2013.01); *G06F 12/123* (2013.01); *G06F 2212/222* (2013.01)

(58) Field of Classification Search
CPC ...... G06F 12/12; G06F 12/121; G06F 12/122; G06F 12/123; G06F 12/1018; G06F 12/0802
See application file for complete search history.

(56) References Cited

U.S. PATENT DOCUMENTS

| | | | | |
|---|---|---|---|---|
| 7,167,953 | B2 * | 1/2007 | Megiddo et al. | 711/129 |
| 7,469,320 | B2 * | 12/2008 | Bonwick et al. | 711/133 |
| 7,676,633 | B1 * | 3/2010 | Fair | G06F 12/0897 |
| | | | | 711/122 |
| 7,836,387 | B1 * | 11/2010 | Wong | G06F 21/606 |
| | | | | 714/819 |
| 2005/0015374 | A1 * | 1/2005 | Reinauer | G06F 12/0868 |
| 2005/0080995 | A1 * | 4/2005 | Davis et al. | 711/133 |
| 2005/0083759 | A1 * | 4/2005 | Wong | G06F 12/0246 |
| | | | | 365/222 |
| 2005/0182906 | A1 * | 8/2005 | Chatterjee | G06F 11/201 |
| | | | | 711/144 |

(Continued)

OTHER PUBLICATIONS

J. Moellenkamp, Some insight into the read cache of ZFS—or: The ARC, c0t0d0s0.org , Feb. 20, 2009.*

(Continued)

*Primary Examiner* — David X Yi
*Assistant Examiner* — Francisco Grullon
(74) *Attorney, Agent, or Firm* — Kilpatrick Townsend & Stockton LLP (57) ABSTRACT

Aspects of the present disclosure disclose systems and methods for managing a level-two persistent cache. In various aspects, a solid-state drive is employed as a level-two cache to expand the capacity of existing caches. In particular, any data that is scheduled to be evicted or otherwise removed from a level-one cache is stored in the level-two cache with corresponding metadata in a manner that is quickly retrievable. The data contained within the level-two cache is managing using a cache list that manages and/or maintains data chunk entries added to the level-two cache based on a temporal access of the data chunk.

18 Claims, 5 Drawing Sheets

(56) References Cited

U.S. PATENT DOCUMENTS

| | | | | |
|---|---|---|---|---|
| 2006/0129782 A1* | 6/2006 | Bansal et al. | | 711/170 |
| 2007/0106847 A1* | 5/2007 | Bonwick et al. | | 711/133 |
| 2008/0301256 A1* | 12/2008 | McWilliams | G06F 12/0284 | 709/214 |
| 2009/0307249 A1* | 12/2009 | Koifman | G06F 3/0623 | |
| 2010/0250833 A1* | 9/2010 | Trika | G06F 11/1441 | 711/103 |
| 2011/0022801 A1* | 1/2011 | Flynn | G06F 9/52 | 711/120 |
| 2011/0072218 A1* | 3/2011 | Manne et al. | | 711/136 |
| 2011/0191522 A1* | 8/2011 | Condict | G06F 12/123 | 711/103 |
| 2011/0246741 A1* | 10/2011 | Raymond | G06F 17/30159 | 711/170 |
| 2011/0276781 A1* | 11/2011 | Sengupta | G06F 12/0862 | 711/216 |
| 2014/0115261 A1 | 4/2014 | Maybee et al. | | |

OTHER PUBLICATIONS

B.Gregg, ZFS L2ARC, Oracle Blogs Jul. 22, 2008.*
Makatos,T., Klonatos, Y., Marazakis, M., Flouris, M., and Bilas, A. (Using Transparent Compression to Improve SSD-based I/O Caches EuroSys'10, Apr. 13-16, 2010, Paris, France).*
Leventhal, A. Flash storage memory. Commun. ACM 51, 7 (2008), 47-51.*
Gregg, Brendan, "ZFS L2ARC", published Jul. 22, 2018, https://bigip-blogs-cms-adc.oracle.com/brendan/entry/test, 10 pages, last downloaded Jun. 2, 2017.
Moellenkamp, Joerg, "Some insight into the read cache of ZFS—or:The ARC", published Feb. 20, 2009 , http://c0t0d0s0.org/archives/5329-Some-insight-into-the-read-cache-of-ZFS-or-The-ARC.html , 8 pages.

* cited by examiner

APPARATUS, SYSTEM AND METHOD FOR MANAGING A LEVEL-TWO CACHE OF A STORAGE APPLIANCE

TECHNICAL FIELD

Aspects of the present disclosure relate to the management of a level to cache in a computing system, and in particular, systems and methods for managing a level 2 cache of a storage appliance.

BACKGROUND

In an attempt to mitigate the impact of the growing gap between CPU performance and storage performance, many computer architectures implement hierarchical memory structures that place one or more higher speed memory caches between the CPU and the slower, disc storage or other from of storage. Generally speaking, memory caches are designed to contain copies of data that is also contained in slower disc storage. However, since cache memory is typically more expensive than disc storage, cache memories are typically limited in size. As such, various caching schemes are used to store frequently used data, or recently used data, or some other subset of all data. To manage the cache after it has become full, existing data is evicted when new data arrives. Caches can only improve performance if data blocks which have already been loaded in the cache are reused before being replaced. Thus, the management of cache capacity and data use is critical.

It is with these concepts in mind, among others, that aspects of the present disclosure were conceived.

SUMMARY

One aspect of the present disclosure involves a system for managing a level two cache. The method includes maintaining a cache list identifying a plurality of data chunks stored in a level-two cache of a file system, each data chunk comprising a respective plurality of data blocks. The method further includes detecting a cache hit corresponding to a first data block associated with a first data chunk of the plurality of data chunks. The method includes re-ordering the cache list by moving an entry in the cache list associated with the first data chunk from a current position in the cache list to a position in the cache list.

Aspects of the present disclosure include systems for maintaining a level two cache. The systems include at least one processor to maintain a cache list identifying a plurality of data chunks stored in a level-two cache of a file system, each data chunk comprising a respective plurality of data blocks. The processor is further configured to detect a cache hit corresponding to a first data block associated with a first data chunk of the plurality of data chunks. The processor is configured to re-order the cache list by moving an entry associated with the first data chunk in the cache list from a current position in the cache list to a position in the cache list.

Aspects of the present disclosure include non-transitory computer readable mediums encoded with instructions for maintaining cache executable by a processor. The instructions include maintaining a cache list identifying a plurality of data chunks stored in a level-two cache of a file system, each data chunk comprising a respective plurality of data blocks. The instructions include detecting a cache hit corresponding to a first data block associated with a first data chunk of the plurality of data chunks. The instructions include re-ordering the cache list by moving an entry in the cache list associated with the first data chunk from a current position in the cache list to a position in the cache list.

BRIEF DESCRIPTION OF THE FIGURES

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

DETAILED DESCRIPTION

Aspects of the present disclosure involve systems and methods for managing a level-two ("L2") cache, which operates in conjunction with a level one ("D") cache to provide caching functions for a storage pool involving one or more hard disc drives or other forms of storage. In various aspects, a solid-state drive ("SSD") may be employed as a L2 cache to expand the capacity of existing L1 caches that may be employing dynamic random access memory ("DRAM") or other relatively faster memory. In particular, any data that is scheduled to be evicted or otherwise removed from the L1 cache may be stored in the L2 cache in a manner that allows the data to be quickly accessed in the L2 cache. For example, the L2 cache may store data that is not requested frequently enough to justify maintaining the data in the L1 cache, but is accessed enough that maintaining a copy of the data in the L2 cache may be beneficial to overall cache performance.

Aspects of the present disclosure involve managing the L2 cache by implementing a cache list that manages and/or maintains data chunk entries added to the L2 cache based on a temporal access of the data chunk. In various aspects, each time a data chunk is accessed in the L2 cache, the cache list is temporally re-ordered, effectively increasing the amount of time the accessed data chunk will remain in the L2 cache.

A cache represents a mechanism used within various computing devices and/or resources to reduce the average wait time to access other memory, disk storage, etc. In particular, the cache represents a smaller, faster memory capable of storing copies of data from frequently used or otherwise important main memory locations so that future requests for the data stored in the cache may be accessed faster than accessing the data from other memory. Various schemes for managing the cache exist, some of which include most recently used (MRU), least recently used (LRU), and numerous others. Regardless, a cache may be used to increase the speed at which data may be accessed by reducing the number of instances that main disk storage or main memory is accessed.

Generally, a cache is made up of a pool of entries. An "entry" includes a specific piece of data and a reference or tag that identifies the data. The data is stored in the cache memory and a reference identifying the data is maintained in an ordered list that is used to locate the stored cache data. Some conventional L2 caches maintain knowledge of the data stored within the L2 cache using a first-in-first out methodology, in which data stored in the L2 cache is maintained according to temporal access. In particular, the oldest data (i.e. the first added to the L2 cache) will be evicted or removed from the L2 cache first, when new data needs to be added to the L2 cache and the L2 cache capacity has been exhausted. Implementing such a round-robin approach to overwriting data in the L2 cache results in data access inefficiencies, as all data will be removed from the L2 cache regardless of whether it may be beneficial to keep some data stored within the L2 cache due to, for example, frequent and/or recent access.

In one particular implementation conforming to the present disclosure, data within an L2 cache may be managed according to a "Most Recently Used" caching scheme. In particular, the MRU scheme may be implemented and managed at a data chunk level (collection of data blocks) based on the temporal access of a data block within a data chunk. By managing the data stored in an L2 cache, the data may be retained or evicted from the L2 cache in a more intelligent and efficient manner, resulting in greater L2 cache performance.

Figure 1:
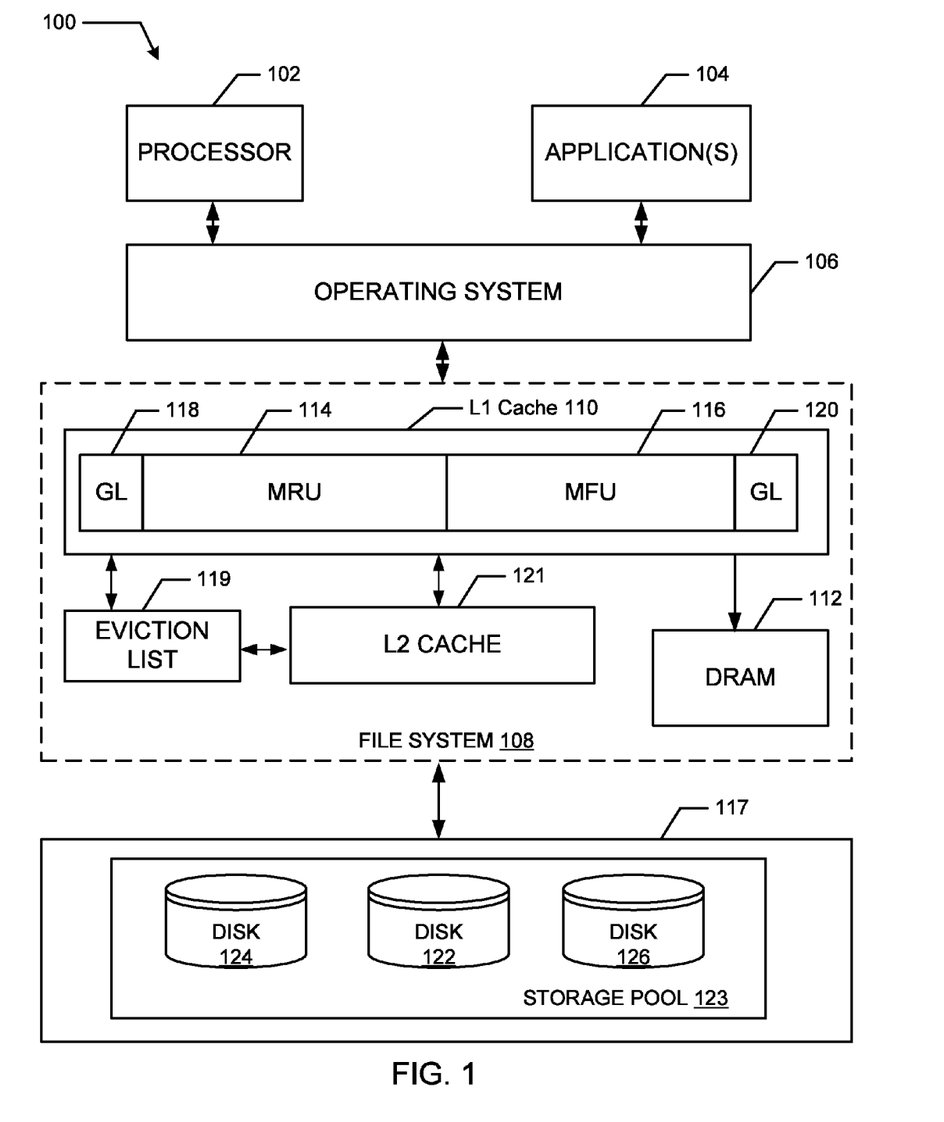
FIG. 1 is an example computing environment for managing an L2 cache in accordance with one aspect of the present disclosure.

FIG. 1 illustrates an example computing architecture 100 for providing a persistent L2 cache. The computing environment 100 may include at least one processor 102, which may be capable of processing various instructions of a computer program, such as application(s) 104, by performing basic arithmetical, logical, and/or input/output operations, etc. The processor 102 may be included in various devices such as a personal computer, work station, server, mobile device, mobile phone, tablet device, processor, and/or other processing device capable of implementing and/or executing instructions, processes, software, applications, etc.

The processor 102 may interface with an operating system 106, which may include functionality to interact with a file system 108. For example, the operating system 106 may interface with the file system 108 via a system call interface (not shown). The operating system 106 may provide operations for users to access files within the file system 108, such as read, write, open, close, etc. The file system 108 may be an object-based file system in which both data and metadata are stored as objects within the file system. In particular, the file system 108 may include functionality to store both data and corresponding metadata in a storage device, such as disk 122. Accordingly, the various operations provided by the operating system 106 correspond to operations on objects. For example, a request to perform a particular operation (i.e., a transaction) is forwarded from the operating system 106, using the system call interface, to the file system 108. In response, the file system 108 may translate the request to perform an operation on an object directly into a request to perform a read or write operation (i.e., an I/O request) at a physical location within the disk 122, or any of the physical storage devices and/or disks 122, 124, 126 in the storage pool 123 located in a storage area 117.

In one particular embodiment, the file system 108 may be a ZFS file system. ZFS represents a combined file system and logical volume manager designed by Oracle®. The features of ZFS include data integrity verification against data corruption modes, support for high storage capacities, integration of the concepts of file system and volume management, snapshots and copy-on-write clones, continuous integrity checking and automatic repair, RAID-Z and native NFSv4 ACLs, and the like. ZFS stores and/or otherwise organizes data into objects known as data "blocks."

The file system 108 may interface or otherwise include an L1 cache 110 capable of storing one or more data objects (e.g. blocks) for frequent and fast data access. The L1 cache 110 may be any type of cache and may use various forms of relatively fast memory. In one particular embodiment, the cache may be an Adaptive Replacement Cache ("ARC") implemented in and/or in conjunction with dynamic random access memory ("DRAM") 112. DRAM 112 may be any type or format and size of dynamic random access memory.

In an ARC implementation, the entries entered into the L1 cache 110 may be maintained or managed in an ordered cache list (not shown) and sorted based on the time of most recent access. Accordingly, new entries into the L1 cache 110 are added at the top of the cache list, after the last entry on the list has been evicted. The new entry added at the top of the list pushes all of the other entries down. Each slot in the ordered cache list identifies specific physical data stored in DRAM 112. For example, each slot in the ordered cache list may be a reference pointing to a specific address and/or location in the DRAM 112.

The ordered cache list of the L1 cache 110 may be a limited size and may be divided into two variable lists, such as a "Most Recently Used" ("MRU") list 114 and a "Most Frequently Used" ("MFU") list 116, in one example. Thus, the MRU 114 and MFU 116 combined constitute a listing of all the data stored in the L1 cache, and each list (MRU and MFU) may be dynamically adjustable in size such that each list may increase or decrease in relation to the size of the other list. For example, assume the size of the L1 cache 110 was fixed at 64 KB, the MFU being 32 KB and the MRU being 32 KB. If the size of the MRU increased 12 KB to 44 KB, the MFU would be decreased proportionally in relation to the MRU or by 12 KB to 20 KB—the fixed size of the overall L1 cache 110 would not change.

The MRU 114 contains the new entries added into the cache and behaves like the ordered list described above. Accordingly, any entry added to the MRU 114 is added at the top of the list, after the last entry of the MRU 114 has been evicted, if the MRU is full. The MFU 116 contains resource entries added to the cache that have already been requested and/or accessed at least one time before the current entry, or entries that are requested/accessed frequently. For example, assume the MFU 116 contained a reference "36" pointing to data block "A". If another request for data block "A" was transmitted from the operating system 106 to the L1 cache 110 of the file system 108, the L1 cache 110 would remove reference "36" from the MRU 114 and add it to the MFU 116. The MFU 116, like the MRU 114, behaves like an ordered cache list described above. Thus, referring to the example above, when reference "36" is added to the MFU 116, the last entry of the MFU 116 is evicted if the MFU is full. Entries entered into the MFU 116 may stay there continuously as long they are referenced again before being evicted. Thus, in the example above, reference "36" would stay in the MFU as long as reference "36" was referenced again before being evicted. If reference "36" were referenced again, it would be added to the top or beginning of the MFU list.

Both the MRU 114 and the MFU 116 may be extended with ghost lists, ("GL") (118 and 120), which are attached to the logical end of the MRU 114 and the MFU 116 respectively. The GLs are used to keep track of recently evicted cache entries from the MRU 114 and the MFU 116 lists. Thus, the MRU GL 118 tracks or records the evicted entries from the MRU 114 and MFU GL 120 tracks or records the cache entries evicted from the MFU 116. The GLs only include metadata corresponding to entries in the MRU and/or MFU and not the data itself. Rather, cache hits in the GLs 118 and 120 may be used to adapt to recent changes in the MRU 114 and/or MFU 116 usage loads. In particular, if entries are continuously being added to the MRU GL 118, it may be an indication that the size of the MRU 114 is too small and should be increased, effectively decreasing the size of the MFU 116. Alternatively, if the MFU GL 120 is continuously receiving additional entries, it may be an indication that the size of the MFU 116 is too small and should be increased, effectively decreasing the size of the MRU 114. In the way described, hits in the ghost lists may be used to dynamically adjust the size of the MRU or the MFU up to some maximum size that is constrained by the overall size of the L1 cache.

The evicted entries from the L1 cache 110 may also be tracked in an eviction list 119 that may behave like an ordered list. Specifically, when it is determined that a data block is no longer required in the L1 cache 110, the data block is referenced in the eviction list 119 for eviction. For example, the ZFS file system may execute a thread or process that determines whether a particular block of data stored in L1 cache 110 should be evicted, and if so, includes a reference to the block of data in the eviction list. Thus, the eviction list 119 contains data currently stored in the L1 cache 110 that may be a candidate for eviction.

Figure 2A:
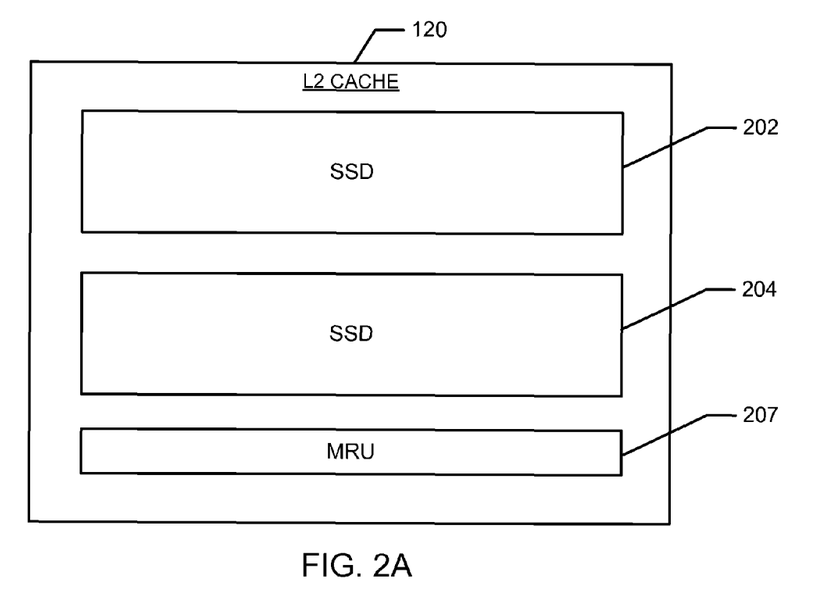
FIGS. 2A and 2B area block diagrams illustrating an L2 cache in accordance with one aspect of the present disclosure.

The L1 cache 110 may be in operable communication with an L2 cache 121. The L2 cache 121 represents a secondary cache that may obtain data evicted or otherwise removed from the L1 cache, amongst other locations depending on the implementation. FIG. 2A illustrates one possible example of the L2 cache in the form of one or more solid-state drives (202 and 204). A solid-state drive ("SSD") represents a type of storage device that uses semiconductor technology as memory to store data persistently. Typically, SSDs use an I/O interface developed for conventional disk storages, such as hard disk drives. Thus, SSDs can be easily integrated with existing computing environments, existing applications, file systems, or the like. In some instances, SSD drives function in accordance with SCSI protocols.

Each SSD (202 or 204) may be any size. For example, each SSD may be 1.5 TBs (terabytes), resulting in an L2 cache capable of storing 3 TBs of data evicted from the L1 cache 110. Referring to the example block "A" above, when block "A" is added to the MFU 116, data must be evicted from the MFU 116. A reference to the data evicted from the MFU 116 is obtained by the GL 120, and the evicted data may be added to or otherwise stored in one of the SSDs 202 or 204 of the L2 cache 121. For example, if a 1 MB (megabyte) data block "B1" were evicted from the MFU 116, as a result of block "A" being added to the MFU 116, the GL 120 will store a reference corresponding to the evicted "B1". Additionally, the L2 cache 121 may received and store data block "B1" and may receive and store metadata and/or a reference to corresponding to block "B1". The L2 cache 121 may access and/or deliver data at a rate slower than the L1 cache 110, but faster than accessing data from the disk 122. Referring to block "B1", the L1 cache 110 may require 1 millisecond to access and/or deliver "B1" and the L2 cache 121 may require 5 milliseconds to access and/or deliver "B1", both of which are faster than accessing "B1" from the disk 122, which may take 50 milliseconds. Thus, in general, the L1 cache 110 may have a lower latency than the L2 cache 121, and the L2 cache 121 may have a lower latency than the disk 122.

Figure 2B:
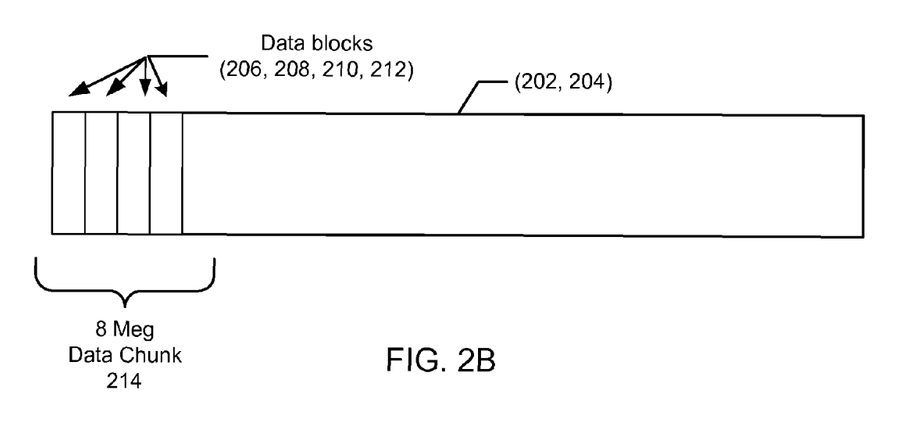

FIG. 2B represents a more detailed view of the SSDs (202 and 204). Each SSD may be divided into multiple segments or data chunks, such as for example, 8 MB segments. Each segment or data chunk may be divided into or otherwise include a header section and a data section. The header section contains metadata describing the specific data included in the data section. For example, the metadata may include: a 'magic' number; a GUID; a timestamp; a version number; and a count of the number of data blocks within the data section. Additionally, the metadata may include a list of entries, one per data block, which contains the unique ID of the block, as well as the size information and an offset into the cache device.

The magic number represents a random 64-bit value that may be use to verify header information. For example, in the context of a ZFS file system, the magic number may be hardcoded and used to identify empty data chunks. Specifically, if the number hardcoded in the ZFS system does not match the value in the header of the segment or data chunk, then the segment or data chunk is considered corrupt, or unwritten, and therefore, empty. The "GUID" is the GUID of the pool in which the data chunk is stored. For example, the GUID may be used to identify storage pool 123. The timestamp is used to determine how long ago a segment or data chunk was written. The timestamp is used to determine how long ago a segment or data chunk was written. In particular, the timestamp may be used to determine the segment or data chunk's initial eviction order. If the timestamps indicates that the segment/data chunk is older, then the data contained within the segment/data chunk is considered to be more useful and important. The version number is used to determine the format of the data in the segment. The "count of the number of data blocks" determines how many "entries"—one per data block—may be discovered in the segment or data chunk. The metadata may also include a marking indicating whether or not a block has been accessed and therefore, that the data chunk containing the data block has been accessed.

Figure 2C:
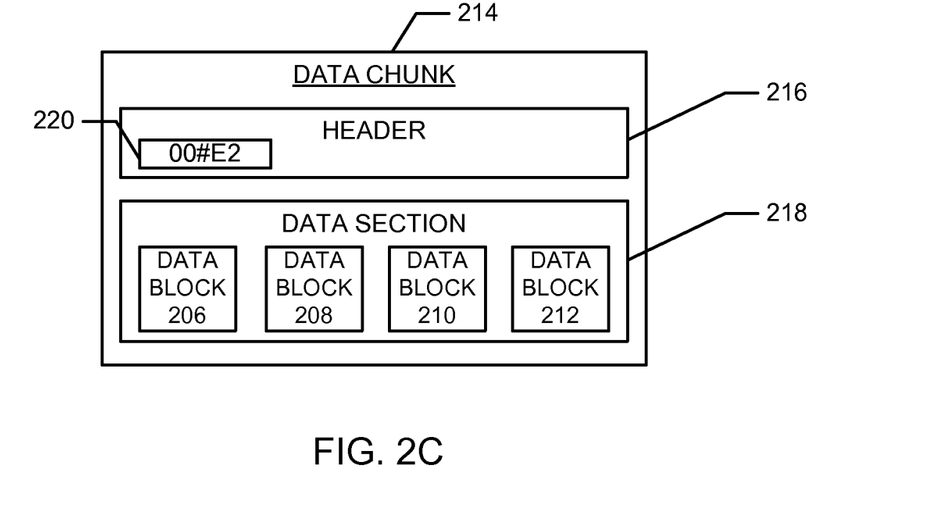
FIG. 2C is a block diagram illustrating a data chunk in accordance with one aspect of the present disclosure.

FIG. 2C is an example illustration of the data chunk 214. As illustrated, data chunk 214 includes a header section 216 that includes, for example, metadata uniquely identifying each data block (206, 208, 210, and 212) and an offset location indicating where the data block is located in the L2 cache 121. For example, the header of a data chunk 214 may be processed to access an identifier 220 that uniquely identifies data block 206 contained within the data chunk 214. The data section 218 stores the actual individual data blocks (206, 208, 210, 212), and in one embodiment, may store the data blocks in a manner identical to how the data blocks were stored in main memory, such as disk 122. As illustrated and for example, data chunk 214 contains data blocks 206-212.

The L2 cache 121 may be organized as an MRU cache with an L2 MRU list 207 at the data chunk level. Thus, any data chunk stored in the L2 cache 121 (e.g. SSD 202 or 204) may be managed as an entry in the L2 MRU list 207 that uniquely identifies the data chunk and its location as stored in the SSD 202 or 204. In particular a reference or pointer may be added as an entry to the beginning of the L2 MRU list 207 identifying a specific data chunk, after the last entry of the L2 MRU list 207 has been evicted or removed. Referring to the "B1" example, an entry uniquely identifying the "B1" data chunk would be added to the beginning of the L2 MRU list 207.

The L2 cache 121 may execute a thread and/or process that periodically scans the L1 cache, and in particular the eviction list 119 of the L1 cache 110, to identify data blocks that may be a candidate for transfer from the L1 cache 110 to the L2 cache 121. The data blocks may be selected from the L1 cache 110 in the form of one or more data chunks and subsequently added to the L2 MRU list 207 of the L2 cache 121.

Figure 3:
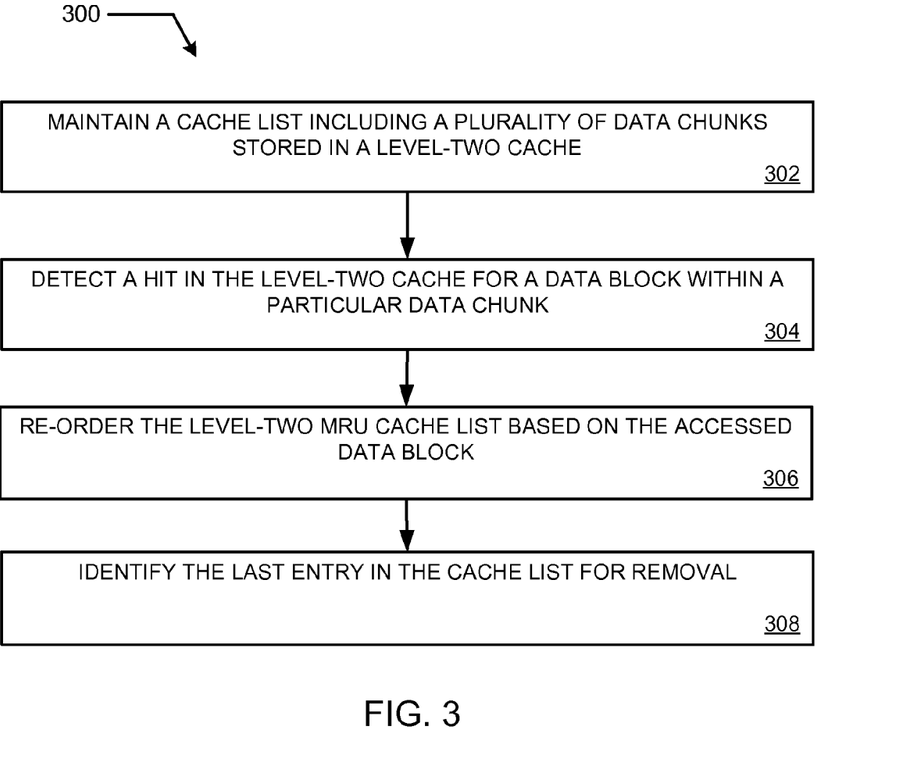
FIG. 3 is an example process for managing an L2 a cache in accordance with one aspect of the present disclosure.

Referring now to FIGS. 1-3, in one particular embodiment, the processing device 102 may launch, run, execute, interpret, or otherwise perform various logical instructions, of the operating system 106, the file system 108, the cache 110, and/or the L2 cache 121 such as process 300, which depicts an example method for managing an L2 cache. Process 300 begins with maintaining a cache list corresponding to an L2 cache (operation 302). In particular, every time a data chunk is stored in the L2 cache 121, an entry is added and subsequently maintained in the L2 MFU list 207. Referring to the "B1" data block, when "B1" was stored in the L2 cache, an entry was added to the L2 MRU list 207 identifying "B1" and any data blocks within "B1" in the L2 cache 121. In one particular embodiment, a data chunk may be added to the L2 cache 121 based on the eviction list of the L1 cache. If one or more data block are referenced or included in the eviction list of the L1 cache 110 and there is capacity to include the one or more data blocks in the form of a data chunk in the L2 cache 121, the data blocks may be written as a data chunk to the L2 cache 121.

Once data has been stored in the L2 cache 121, a cache hit may be identified, detected, or otherwise occur for a particular data block stored in the L2 cache (operation 304). A cache hit in the L2 cache indicates that data attempting to be accessed or read is currently stored in the L2 cache 121, and therefore, available for access. For example, referring to data chunk 214 of FIG. 2B, a read request may be received requiring access to data block 206 stored within a data chunk 214 that is currently stored in the SSD 202 or 204. Various components of the computing architecture 100 may process the read request and determine that the data block "c" is located within data chuck B1 which is currently stored in L2 cache 121. For example, in one particular embodiment, the L1 cache 110 may be traversed in an attempt to access data block 206. If block 206 is not found in the L1 cache 110, the L2 cache 121 may be traversed, to locate data block 206. Specifically, the metadata within the headers of the various data chunks within the L2 cache 121 may be analyzed to locate a pointer identifying data block 206 within a particular data chunk stored in the L2 cache 121. Subsequently, the metadata corresponding to the particular data chunk (i.e. metadata in the header of the data chunk) may be updated, marked, or annotated to indicate the particular data chunk was accessed.

In response to a hit in the L2 cache 121, the L2 MRU list 207 may be re-ordered at the data chunk level (operation 306). Stated differently, the L2 MRU list 207 organizes chunks of data based on the access of individual blocks within a data chunk. In particular, the entry (i.e. the reference or pointer) in the L2 MRU list 207 corresponding to the specific data chunk containing the accessed data block may be positioned or placed at the beginning of the L2 MRU list 207. For example, referring to data chunk 214 of FIG. 2B, when a request to read data block 208 is received and processed, the reference or pointer within the L2 MRU list 207 corresponding to data chunk 214 is repositioned to the location within the L2 MRU that signifies the most recent temporal access, such as at the beginning of the L2 MRU list 207. By positioning the entry corresponding to data chunk "B1" in or at the position considered to be temporally the most recently accessed, such as the beginning of the list, data chunk 214 will be the last data chunk to be evicted or removed from the L2 cache, as it is now the most recently or temporally accessed data chunk. The data chunk referenced by the entry in the position that signifies the least recent temporal access, such as the last or end position in the L2 MRU list 207 may be identified for removal (operation 308). Stated differently, when data chunks that include data blocks that have been recently accessed are moved to front of the L2 MRU list 207 (the most temporally recent position), the last entry in the list may be identified as corresponding to the least recently accessed data chunk and therefore may be removed or overwritten. While the examples above have indicated that the front position of the list is the most temporally recent position, it is contemplated that any position in the L2 MRU list 207 may be deemed the most temporally recent position.

Figure 4:
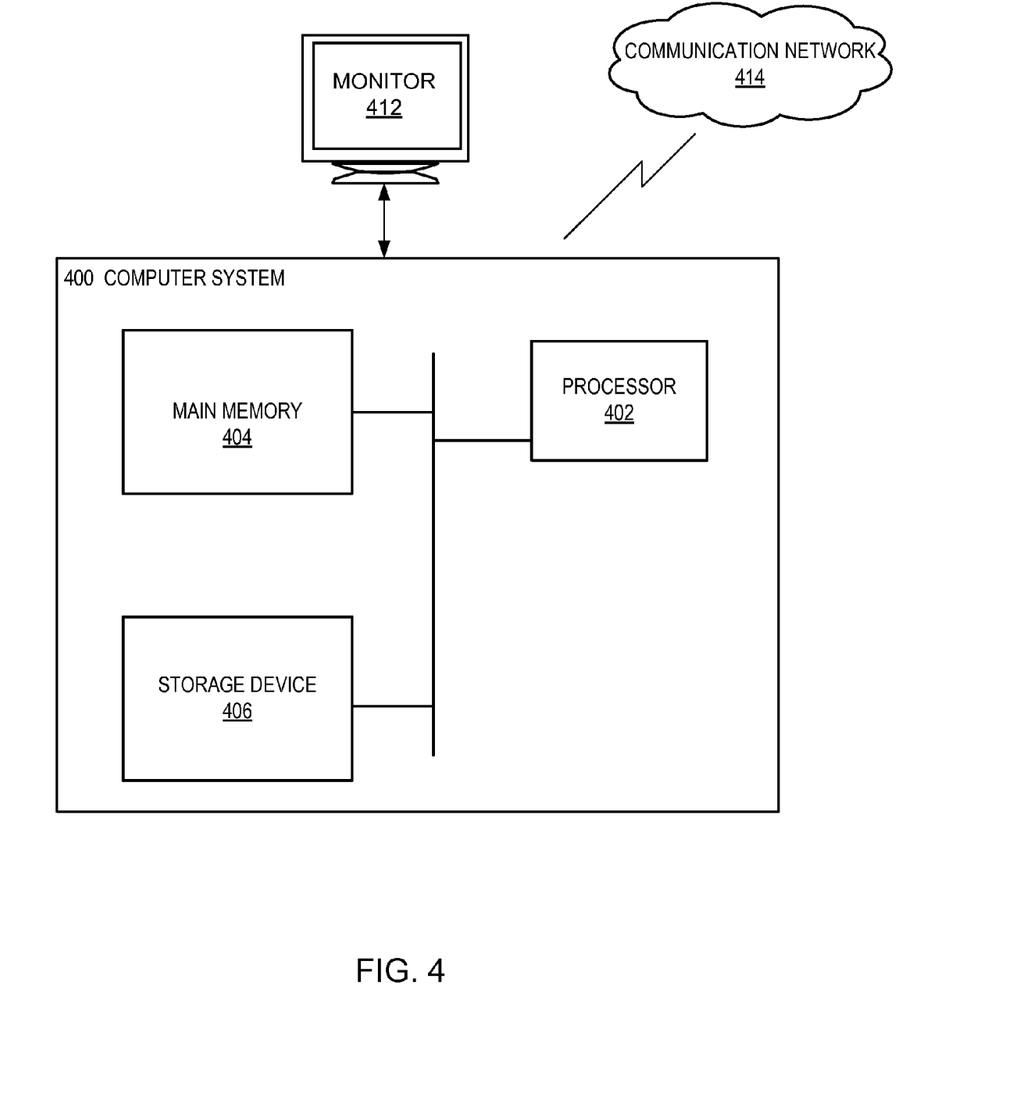
FIG. 4 is an example computing system in accordance with one aspect of the present disclosure.

The various inventive concepts described above may be implemented on virtually any type of computer regardless of the platform being used. For example, as shown in FIG. 4, a computer system 400 includes a processor 402, main memory 404, a storage device 406, and numerous other elements and functionalities typical of today's computers (not shown). The computer 400 may also include input means, such as a keyboard and a mouse and output means, such as a monitor 412. The computer system 400 may be connected to a local area network (LAN) or a Wide area network (e.g., the Internet), such as communication network 414, via a network interface connection (not shown). Those skilled in the art will appreciate that these input and output means may take other forms.

Further, those skilled in the art will appreciate that one or more elements of the computer system 400 may be located at a remote location and connected to the other elements over a network. The invention may be implemented on a distributed system having a plurality of nodes, where each portion of the invention (e.g., the operating system, file system, cache, application(s), etc.) may be located on a different node within the distributed system, and each node may corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disc (CD), a diskette, a tape, a digital versatile disk (DVD), or any other suitable tangible computer readable storage device.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for maintaining a level-two cache list, the method comprising:
   receiving a request to access a requested data block in a particular data chunk, wherein the particular data chunk is in a level-two cache, the level-two cache comprising:
      a level-two cache list stored in a persistent memory type, comprising a plurality of entries, each entry of the plurality of entries corresponding to a data chunk of a plurality of data chunks, each data chunk of the plurality of data chunks comprising:
         a plurality of data blocks, wherein each data block of the plurality of data blocks was evicted from a level-one cache comprising a volatile memory type;
         a header, separate from the plurality of data blocks, comprising:
            a time stamp that indicates a time the data chunk was accessed;
            a plurality of identities, wherein each of the plurality of identities is associated with one of the data blocks of the plurality of data blocks; and
            a plurality of locations, wherein each of the plurality of locations includes a location in the level-two cache of one of the data blocks in the plurality of data blocks;
         wherein the level-two cache list is a most recently used cache list that organizes each data chunk of the plurality of data chunks based on a temporal access of individual data blocks within the plurality of data chunks; and
   updating, in response to receiving the request, the time stamp in the header of the particular data chunk;
   identifying a new list position for a data-chunk entry associated with the particular data chunk based on the updated time stamp; and
   re-ordering the level-two cache list by moving the data-chunk entry from an existing position to the new list position in the level-two cache.

2. The method of claim 1, wherein the level-two cache comprises one or more solid state drives.

3. The method of claim 2, wherein the new list position in the level-two cache is a temporally most recently used position in the level-two cache list.

4. The method of claim 2, wherein an about-to-be-evicted data chunk in the plurality of data chunks corresponds to a last entry in the level-two cache list.

5. The method of claim 1, wherein the level-two cache is stored in a file system that is a ZFS.

6. The method of claim 1, wherein the level-two cache is an adaptive replacement cache.

7. A system for maintaining a level-two cache list, the system comprising:
   a level-two cache, comprising:
      a level-two cache list stored in a persistent memory type, comprising a plurality of entries, each entry of the plurality of entries corresponding to a data chunk of a plurality of data chunks, each data chunk of the plurality of data chunks comprising:
         a plurality of data blocks, wherein each data block of the plurality of data blocks was evicted from a level-one cache comprising a volatile memory type;
         a header, separate from the plurality of data blocks, comprising:
            a time stamp that indicates a time the data chunk was accessed;
            a plurality of identities, wherein each of the plurality of identities is associated with one of the data blocks of the plurality of data blocks; and
            a plurality of locations, wherein each of the plurality of locations includes a location in the level-two cache of one of the data blocks in the plurality of data blocks; and
         wherein the level-two cache list is a most recently used cache list that organizes each data chunk of the plurality of data chunks based on a temporal access of individual data blocks within the plurality of data chunks; and
   at least one processor to:
      receive a request to access a requested data block of the plurality of data blocks in the level-two cache, wherein the requested data block is in a particular data chunk of the plurality of data chunks;
      in response to receiving the request, update the time stamp in the header of the particular data chunk;
      identify a new list position for a data-chunk entry associated with the particular data chunk based on the updated time stamp; and
      re-order the level-two cache list by moving the data-chunk entry from an existing position to the new list position in the level-two cache list.

8. The system of claim 7, wherein the level-two cache comprises one or more solid state drives.

9. The system of claim 8, wherein the new list position in the level-two cache is a temporally most recently used position in the level-two cache list.

10. The system of claim 8, wherein an about-to-be-evicted data chunk in the plurality of data chunks corresponds to a last entry in the level-two cache list.

11. The system of claim 7, wherein the level-two cache is stored in a file system that is a ZFS.

12. The system of claim 7, wherein the level-two cache is an adaptive replacement cache.

13. A non-transitory computer readable medium encoded with instructions for maintaining a level-two cache executable by a processor, the instructions comprising:
  receiving a request to access a requested data block in a particular data chunk, wherein the particular data chunk is in a level-two cache, the level-two cache comprising:
    a level-two cache list stored in a persistent memory type, comprising a plurality of entries, each entry of the plurality of entries corresponding to a data chunk of a plurality of data chunks, each data chunk of the plurality of data chunks comprising:
      a plurality of data blocks, wherein each data block of the plurality of data blocks was evicted from a level-one cache comprising a volatile memory type;
      a header, separate from the plurality of data blocks, comprising:
        a time stamp that indicates a time the data chunk was accessed;
        a plurality of identities, wherein each of the plurality of identities is associated with one of the data blocks of the plurality of data blocks; and
        a plurality of locations, wherein each of the plurality of locations includes a location in the level-two cache of one of the data blocks in the plurality of data blocks;
    wherein the level-two cache list is a most recently used cache list that organizes each data chunk of the plurality of data chunks based on a temporal access of individual data blocks within the plurality of data chunks; and
  updating, in response to receiving the request, the time stamp in the header of the particular data chunk;
  identifying a new list position for a data-chunk entry associated with the particular data chunk based on the updated time stamp; and
  re-ordering the level-two cache list by moving the data-chunk entry from an existing position to the new list position in the level-two cache.

14. The non-transitory computer readable medium of claim 13, wherein the level-two cache comprises one or more solid state drives.

15. The non-transitory computer readable medium of claim 14, wherein the new list position in the level-two cache is a temporally most recently used position in the level-two cache list.

16. The non-transitory computer readable medium of claim 14, wherein an about-to-be-evicted data chunk in the plurality of data chunks corresponds to a last entry in the level-two cache list.

17. The non-transitory computer readable medium of claim 13, wherein the level-two cache is stored in a file system that is a ZFS.

18. The non-transitory computer readable medium of claim 13, wherein the level-two cache is an adaptive replacement cache.

* * * * *

UNITED STATES PATENT AND TRADEMARK OFFICE
CERTIFICATE OF CORRECTION

| | |
|---|---|
| PATENT NO. | : 9,779,027 B2 |
| APPLICATION NO. | : 13/655255 |
| DATED | : October 3, 2017 |
| INVENTOR(S) | : Mark Maybee, Mark J. Musante and Victor Latushkin |

It is certified that error appears in the above-identified patent and that said Letters Patent is hereby corrected as shown below:

In the Specification

In Column 1, Line 19:
Remove "from" and replace with --form--

In Column 2, Line 32:
Remove "D" and replace with --L1--

Signed and Sealed this
First Day of January, 2019

Andrei Iancu
*Director of the United States Patent and Trademark Office*